US006230778B1

(12) United States Patent
Latwesen

(10) Patent No.: US 6,230,778 B1

(45) Date of Patent: May 15, 2001

(54) DEVICE FOR APPLYING LABELS TO FLAT MAIL ITEMS

(75) Inventor: Frank Latwesen, Berlin (DE)

(73) Assignee: Siemens Aktiengesellschaft, München (DE)

(*) Notice: Subject to any disclaimer, the term of this patent is extended or adjusted under 35 U.S.C. 154(b) by 0 days.

(21) Appl. No.: 09/242,070

(22) PCT Filed: Aug. 7, 1997

(86) PCT No.: PCT/DE97/01680

§ 371 Date: Jan. 10, 2000

§ 102(e) Date: Jan. 10, 2000

(87) PCT Pub. No.: WO98/05559

PCT Pub. Date: Feb. 12, 1998

(30) Foreign Application Priority Data

Aug. 7, 1996 (DE) .............................................. 196 31 834

(51) Int. Cl.[7] ................................ B32B 3/04; B65C 1/04; B65C 9/02; B65C 9/18; B65C 9/32

(52) U.S. Cl. .......................... 156/483; 156/363; 156/445; 156/485; 156/517; 156/230; 156/250; 156/DIG. 33

(58) Field of Search .................................... 156/230, 240, 156/241, 247, 277, 289, 215, 364, 443, 483, 485, 517, DIG. 33, 567, 363, 250; 428/195

(56) References Cited

U.S. PATENT DOCUMENTS

| | | | |
|---|---|---|---|
| 1,454,889 | 5/1923 | Gustafson . | |
| 4,188,252 | 2/1980 | Brown . | |
| 4,473,429 * | 9/1984 | Crankshaw | 156/483 |
| 4,549,454 * | 10/1985 | Yamashita | 83/27 |
| 4,589,945 * | 5/1986 | Polit | 156/497 |
| 4,639,287 * | 1/1987 | Sakura | 156/361 |
| 5,088,712 | 2/1992 | Luperti . | |
| 5,200,007 | 4/1993 | Svatsky . | |
| 5,314,567 | 5/1994 | Noll . | |
| 5,441,796 * | 8/1995 | Steidinger et al. | 428/195 |

FOREIGN PATENT DOCUMENTS

| | | |
|---|---|---|
| 720 253 | 4/1942 | (DE) . |
| 11 16 145 | 10/1961 | (DE) . |
| 11 426 | 11/1992 | (DE) . |
| 0 044 016 | 1/1981 | (EP) . |

* cited by examiner

*Primary Examiner*—Richard Crispino
*Assistant Examiner*—J. A. Lorengo
(74) *Attorney, Agent, or Firm*—Venable; Catherine M. Voorhees

(57) ABSTRACT

In a device for applying labels to a flat mail item that is conveyed standing on one edge, having a conveyor for conveying the individual items along a predetermined conveying path; a label conveyor for conveying the individual labels, the device being controlled by a sensor device for determining the position of the front edge of the item; a pressing device for pressing the labels onto the item surface; a label holder, which is disposed in a region in front of the pressing device, with respect to the conveying direction of the item, and into which the labels are conveyed by the label conveyor, the label holder is embodied such that the labels can be positioned perpendicularly to the conveying direction and oriented with their adhesive side counter to the conveying direction in the conveying path of the items; as soon as the front edge of an item falls short of a predetermined distance from the label holder, the sensor device controls the conveyor device such that it conveys a label to the label holder, so the front edge of the item impacts the label and the label is moved on both sides in the direction of the item surface, and, simultaneously, in the direction of the pressing device, effecting the release of the label from the label holder and the pressing of the label against the item surface by the pressing device.

7 Claims, 5 Drawing Sheets

DEVICE FOR APPLYING LABELS TO FLAT MAIL ITEMS

BACKGROUND OF THE INVENTION

The invention relates to a device for applying labels, as defined in the preamble of the independent claim 1.

Applying labels to flat mail items quickly and reliably poses a problem in the processing of flat mail items, particularly letters, post cards, etc., in mail-processing facilities. An example of this is automatic mail forwarding. In this instance, mail items are separated out for forwarding addressing, and re-addressed with corresponding, predetermined data stored in a database. A label that covers the old address and, if applicable, a barcode printed on the surface of the mail item, is affixed to these items. The label is then provided with a new barcode and the corresponding, new address. The label is applied in devices that are integrated into automatic letter-distribution systems. The mail volume for such distribution systems varies in format, weight and thickness. In these systems, the items are conveyed at a speed of, for example, 3.6 m/sec, which places stringent requirements on the speed at which the labels must be applied, as well as on the exact positioning of the labels. Furthermore, the handling and especially the transport of the labels to the item surface represent a general problem when the label has a self-adhesive surface.

A device of the above-outlined type is disclosed in U.S. Pat. No. 5,200,007.

It is the object of the present invention to provide a device for applying labels to flat mail items, wherein the supply of the labels to the region of application and the trimming of the labels is performed inexpensively with high advancing speed and accurate positioning.

According to the invention, this object is accomplished by the features of claim 1. Advantageous embodiments of the invention ensue from the dependent claims and the description.

A notable advantage of the invention is a high flexibility in the positioning of the labels on the mail items, and a simple process of supplying the labels to the application region. The conveying speed of the mail items need not be reduced for label application. For the duration of the process of supplying the labels to the application region, and during the application itself, the labels are mechanically held, so no uncontrolled changes in position occur. The labels can be supplied from a simple label strip or a label carrier strip. The supply of the label to the application region and the trimming of the label strip are integrated in an especially simple manner.

The invention is described in detail below by way of the drawing, which shows in:

DETAILED DESCRIPTION OF THE INVENTION

Figure 1A:
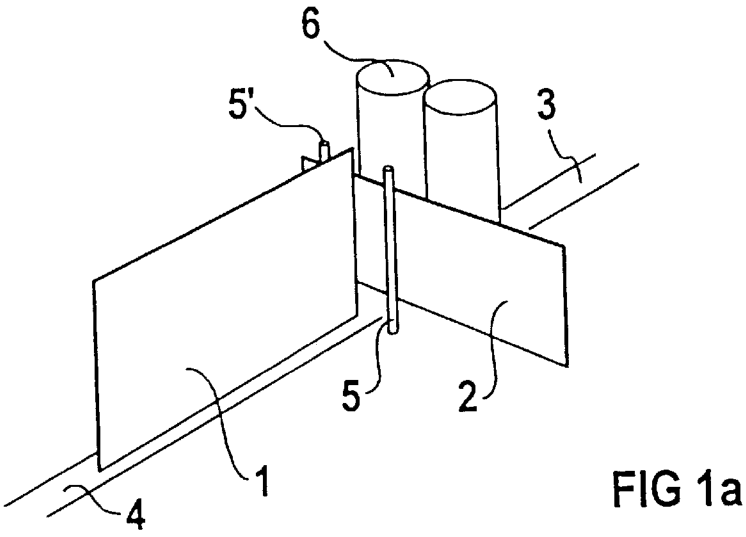
FIGS. 1*a–c* are a schematic representations of the essential elements of a device of the invention during different phases of label application.
Figure 1B:
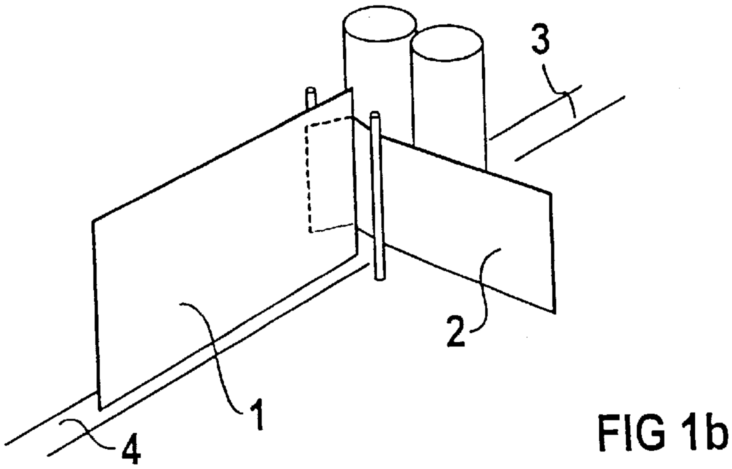
Figure 1C:
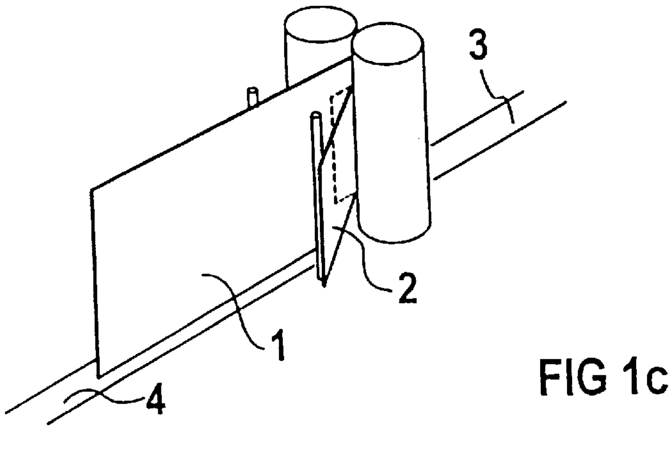

FIGS. 1*a–c* schematically shows the essential elements of a labeling device, with a mail item 1 and a label 2, in different phases a, b and c of the application of the label to the mail item. The mail item is conveyed, individually and standing on one edge, along a predetermined conveying path 4 by a conveyor 3. The conveyor 3 is not shown in detail in FIGS. 1*a–c*.

The mail items are preferably transported in a suspended manner by endless belts, with the belts being guided by a system of running rollers and the items being clamped at their upper edge. The labels are held by a label holder 5, which is disposed in front of a pressing device 6 with respect to the conveying direction of the items 1. The conveyor conveys the items to pressing device 6. The label holder 5, 5' is embodied such that the labels are oriented perpendicularly in the conveying direction and can be positioned with their adhesive side counter to the conveying direction in the conveying path of the items 1. In the embodiment according to FIGS. 1*a–c*, at least two wire-like elements 5, 5', which extend parallel to one another and parallel to the surface of the mail item, and perpendicular to the conveying direction, are provided as the label holder 5. The conveying path 4 of the items preferably extends between these elements. In the region between the two elements 5, 5' and the pressing device 6, the labels can be oriented with their adhesive side counter to the conveying direction.

The device further includes a sensor device, which is, however, not shown in FIGS. 1*a–c*. As soon as the front edge of a mail item 1 falls short of a predetermined distance from the label holder, the sensor device controls the label conveyor such that it supplies a label to the label holder 5, 5', so the front edge of the item 1 impacts the label 2 and the label is moved on both sides in the direction of the item surface, and, simultaneously, with the item in the direction of the pressing device 6 (see FIGS. 1*b* and 1*c*). In the process, the label is released from the label holder. At the same time, the pressing device 6 presses the label against the item surface.

Figure 2:
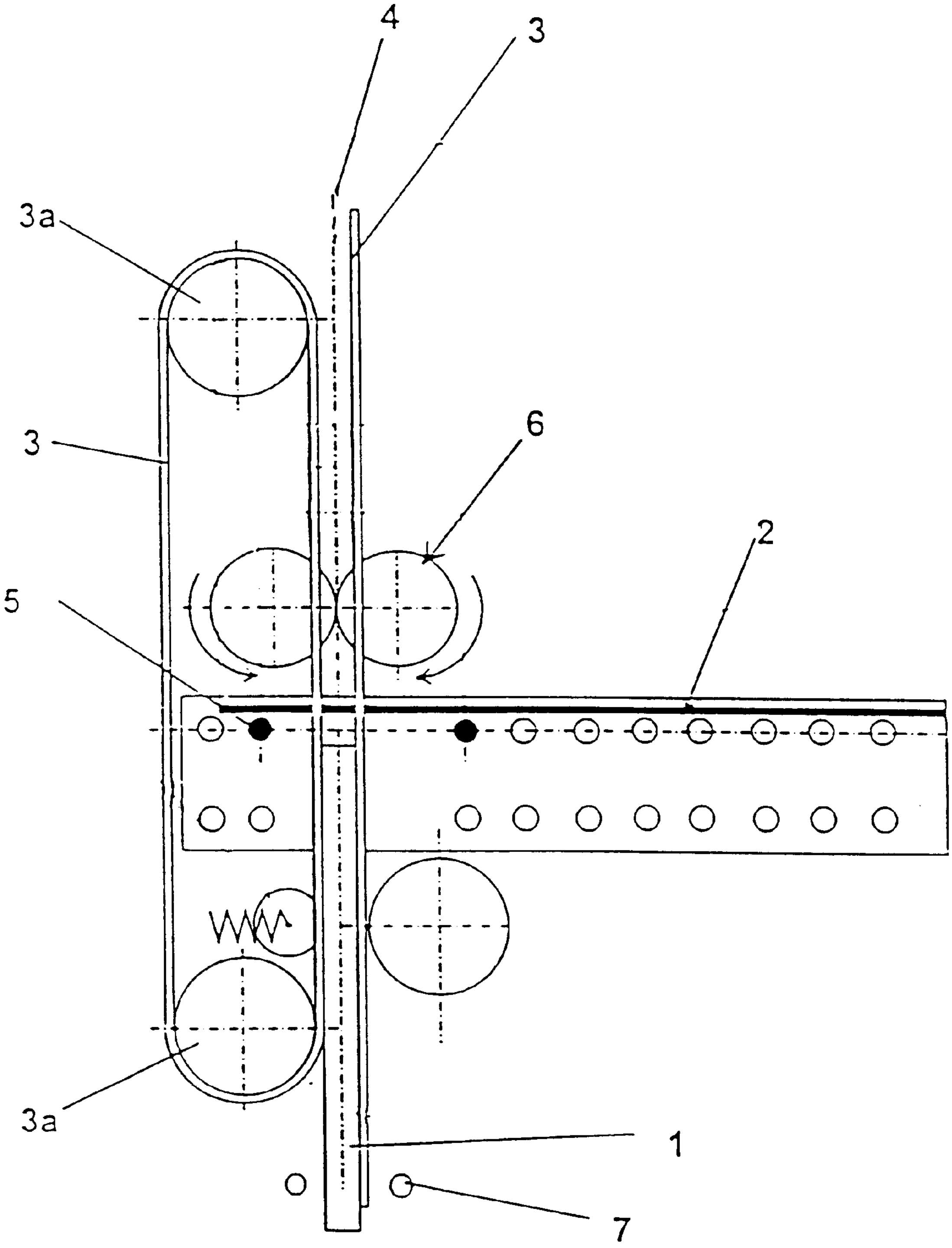
FIG. 2 is a plan view of a device of the invention.

FIG. 2 shows a plan view of a device. Foam-material rollers that rotate at the same tangential speed at which the mail items are transported in the conveyor are provided as the pressing device 6. The rollers are preferably driven separately, although a drive effected by belts that run between the rollers is also possible. The belts are guided on rollers 3*a*. A light barrier 7, which is a component of a sensor device for determining the position of the front edge of an item, and with which the label conveyor is controlled, is disposed at an appropriate distance in front of the label holder 5. FIGS. 1*a* and 2 show the initial position of the label in the device. A mail item is shown in a position shortly before it impacts the label. The label is held such that its adhesive side sticks to the wire-like elements. The label is preferably applied, on these elements, from below or above. FIG. 1*b* shows how the mail item impacts the label and the label begins to wrap around the item. At the same time, the label is released from the wire-like elements. FIG. 1*c* shows how the rollers press the label against the item. As soon as the rear edge of the item has been conveyed out of the region of the label holder, a new label is supplied.

Figure 3:
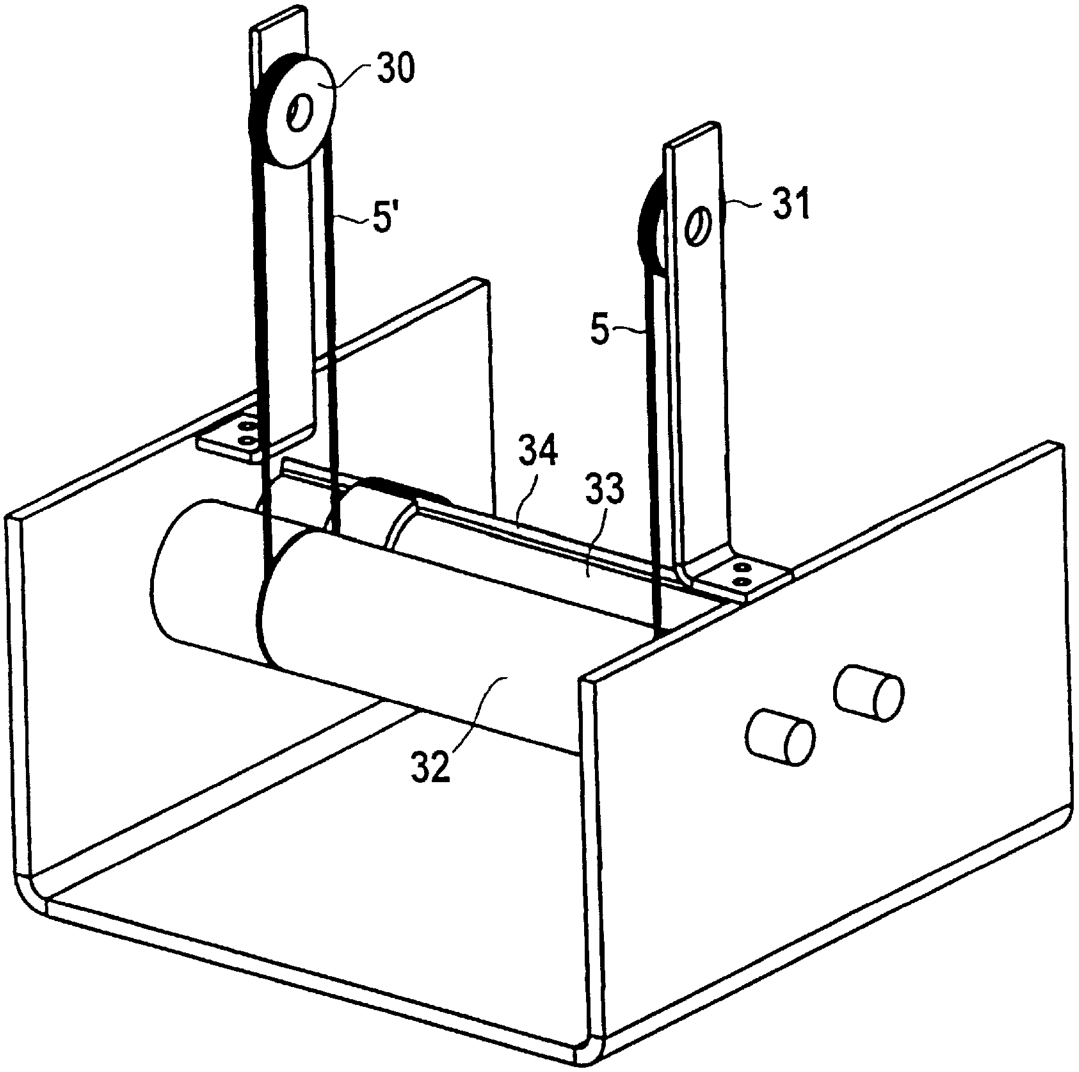
FIG. 3 is a representation of a label conveyor and trimming device.

According to FIG. 3 narrow, preferably wire-like, endless elements 5, 5' are provided which extend parallel to one another and to the upper surface of the item and perpendicularly to the direction of conveyance and which are guided via upper and lower deflection-roller pairs 30, 31, 40, 41, are preferably provided as the holder; one of these deflection-roller pairs is driven. The labels are conveyed from below and the conveyor is integrated with a trimming device. Each label is conveyed between a rubber or plastic roller 32 and a blade shaft 33. The rubber or plastic roller 32 is embodied as a hollow cylinder, is disposed on a driven shaft 43, and is free-wheeling relative to the shaft 43. The lower deflection-roller pair 40, 41 is disposed so as to co-rotate on the shaft 43, and has a diameter $D<D_1$, with $D_1$ being the diameter of the rubber or plastic roller. The axis of the blade shaft 33 extends parallel to the axis of the first shaft, and is likewise driven. The blade shaft has at least one trimming element 34, whose axis extends parallel to those of the shafts, and is pressed with a prestress against the rubber or plastic roller.

The labels are transported, with frictional lockup, as a flat label strip between the rubber or plastic roller 32 and the shaft 33. As soon as the trimming element 34 meets the rubber or plastic roller 32, the trimming element cooperates with the label strip to effect a trimming of the label strip. The wire-like elements 5, 5' pass through the rubber or plastic roller.

Figure 4:
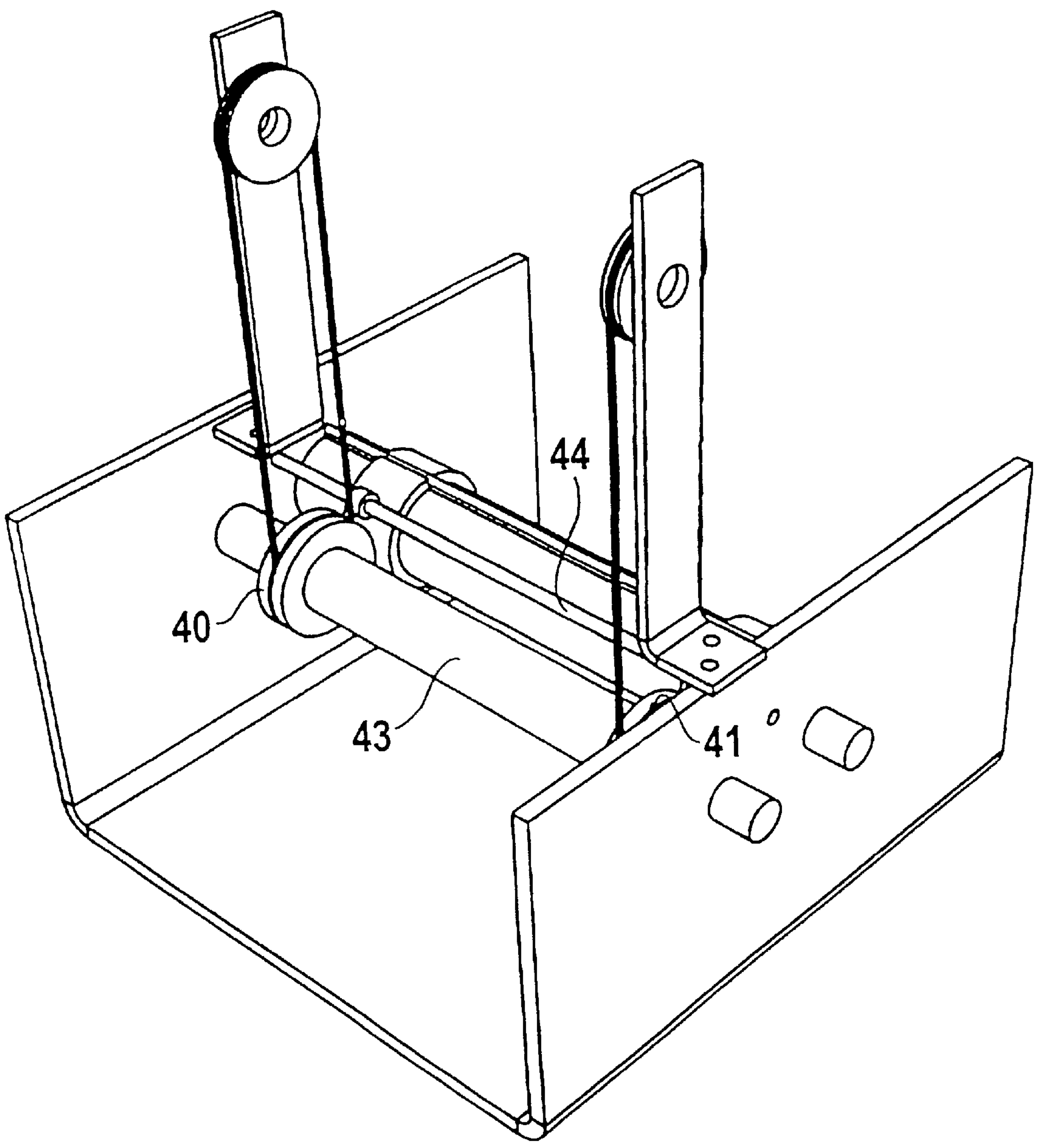
FIG. 4 is a representation of the device according to FIG. 3, without a plastic roller.
Figure 5:
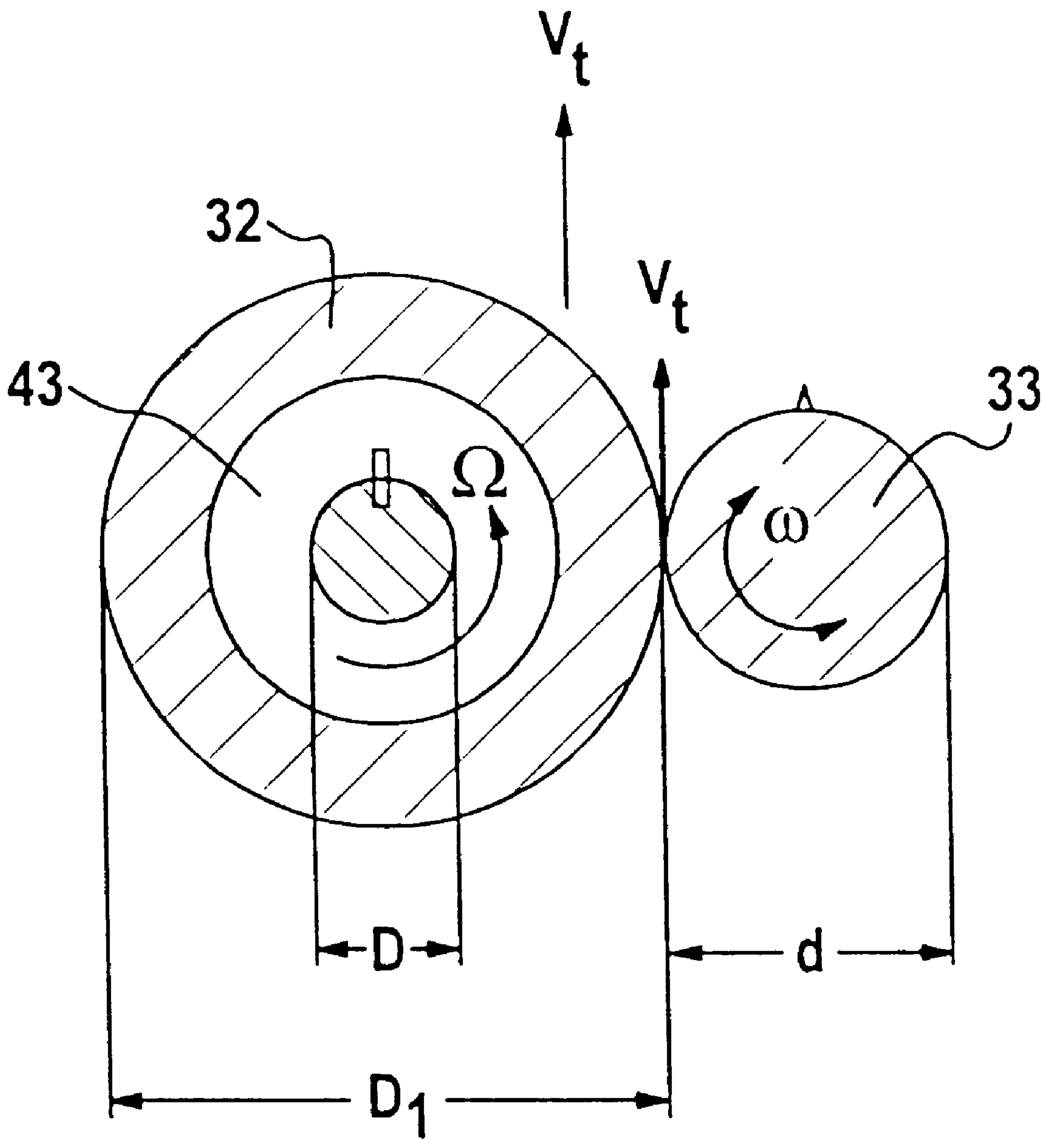
FIG. 5 is a representation of the diameter/angular speed ratios in the trimming device.

As FIG. 4 shows, a pressing roller 44 presses the label against the wire-like elements, and the label sticks to them. The rotation of the shaft 43 effects a conveyance of the label into the region of the item's conveying path. The label is inserted, as a label strip or on a carrier strip, between the rubber or plastic roller and the shaft 43. The shaft 43 is preferably driven by a stepping motor. The wire-like elements 5, 5' are preferably moved at the same speed at which the label is conveyed. It must be taken into account that the rubber or plastic roller 32 and the shaft 43 rotate at different angular speeds. So that the wire-like elements have the same speed as the conveyed label, at a given angular speed $\omega$ of the shaft 33, the angular speed of the shaft 43 is to be selected as $\Omega=\omega\cdot d/D$, with d being the diameter of the shaft 33 and D being the diameter of the shaft 43, on which the wire-like elements are guided. This relationship ensues from a simple calculation illustrated in FIG. 5, in which $V_t$ represents the speed of the label and the wire-like elements.

Stepping motors that can be synchronized simply in the necessary manner are preferably provided as a drive mechanism for the shafts 33 and 43. As soon as a label has been cut from a label strip, the wire-like elements can be moved at an increased speed, so the label is conveyed at an accelerated pace into the holding position. The blade shaft 33 supporting the trimming element returns to its initial position.

As shown in FIG. 3, the rubber or plastic roller 32 is axially subdivided into numerous parts, which are separated by a small intermediate space that corresponds to the thickness of the wire elements. At these locations, the trimming element cannot separate the label, so small tabs remain, which are cut up as soon as the label sticking to the wire is moved away and is drawn into the take-up position on the wire-like elements. The stability of the tabs can be optimized by the penetration depth of the blade.

The label conveyor can also be embodied such that the labels are not only inserted perpendicularly into the conveying path from below, but also from above or from the side.

The wire-like elements can comprise plastic-coated metal, carbon or aramide fibers. Different types of rollers, endless belts, inflatable balloons or nozzles that expel compressed air can be provided as the pressing device.

The label is preferably applied asymmetrically to the mail item, so a larger part of the label covers the side on which the original address information and a barcode imprint appear than the opposite side of the item. To hold the labels in a stable manner in this case, it is preferable to provide more than two wire-like elements.

It is possible to position the labels on the mail item through a suitable selection of the label position in the label holder 5.

What is claimed is:

1. A device for applying labels to flat mail items, which are conveyed separately standing on one edge via a conveyor in a direction along a predetermined conveying path, said device comprising:

a label conveying and cutting device that is controlled by a sensor device for determining the position of a front edge of the flat mail item, said label conveying and cutting device further including a rubber or plastic roller having an outside diameter D1 and a longitudinal axis, a driven blade shaft with an outside diameter d and having a longitudinal axis where the axes of said rubber or plastic roller and said blade shaft are parallel to one another and said blade shaft is pressed against said rubber or plastic roller, said blade shaft having at least one trimming element arranged parallel to the blade shaft axis wherein said rubber or plastic roller and said driven blade shaft convey and cut individual labels;

a pressing device for pressing the individually cut labels onto a surface of a conveyed mail item;

a label holder arranged in front of the pressing device relative to the conveying direction of the mail items and into which the individually cut labels are conveyed by said label conveying and cutting device, said label holder including at least two thin, endless elements that are arranged parallel to each other and to the mail item surface, said thin, endless elements being disposed perpendicular to the conveying path where each endless element is guided over two deflection rollers; and a driveshaft that supports and drives deflection rollers which guide a respective endless element where each supported deflection roller has a diameter D, said driveshaft being disposed in said label conveying and cutting device, and wherein said rubber or plastic roller is located on said driveshaft between the supported deflection rollers as free-wheeling hollow cylinder, the outside diameter D of the supported deflection rollers is smaller than the outside diameter D1 of said rubber or plastic roller and the angular speed of said driveshaft supporting the deflection rollers is equal to the angular speed of the driven blade shaft multiplied by the factor d/D.

2. A device according to claim 1, wherein the thin, endless elements are wire-type plastic-coated metal, carbon or aramide fibers.

3. A device according to claim 1, wherein said pressing device includes one of oppositely arranged rollers, endless belts, inflatable balloons and nozzles that expel compressed air.

4. A device according to claim 1, wherein said label holder is embodied so that the individual cut labels with adhesive on one side can be positioned perpendicularly to the conveying direction of the mail items and oriented with the adhesive side counter to the conveying direction of the mail items; and when the front edge of a mail item is determined by said sensor device to be a predetermined distance from said label holder, said sensor device causes said label conveying and cutting device to convey an individual label to said label holder so that the front edge of the conveyed mail item impacts a middle section of the individual label, and the label is moved on both sides toward the mail item surface and simultaneously in the direction of said pressing device thereby effecting release of the individual label from said label holder, and the individual label is pressed against the conveyed mail item surface by said pressing device.

5. A device according to claim 1, wherein each individual label has a side with adhesive, the conveying path of the mail items extends between the at least two thin, endless elements, and the individual label is disposed on the at least two elements with their adhesive side in a region between the at least two elements and the pressing device.

6. A device according to claim 1, wherein the individual labels are inserted into the label holder perpendicularly to the conveying path of the mail items from one of below, above or the side.

7. A device according to claim 1, wherein the longitudinal axis of said driven blade shaft extends parallel to a longitudinal axis of the driveshaft; said driven blade shaft is pressed with a prestress against said rubber or plastic roller so that a flat label strip can be transported, with frictional lockup, between said rubber or plastic roller and said driven blade shaft; the trimming element cooperates with the label strip to cut or trim the label strip when the trimming element meets said rubber or plastic roller; and the label is pressed against the endless elements and conveyed into the region of the mail item conveying path.

* * * * *